(12) United States Patent
Suh

(10) Patent No.: US 8,508,471 B2
(45) Date of Patent: Aug. 13, 2013

(54) COOPERATIVE MULTI-DISPLAY

(75) Inventor: Doug Young Suh, Seongnam-si (KR)

(73) Assignee: University-Industry Cooperation Group of Kyung Hee University, Yongin-Si (KR)

( * ) Notice: Subject to any disclaimer, the term of this patent is extended or adjusted under 35 U.S.C. 154(b) by 1035 days.

(21) Appl. No.: 12/540,843

(22) Filed: Aug. 13, 2009

(65) Prior Publication Data

US 2011/0037742 A1 Feb. 17, 2011

(51) Int. Cl.
*G09G 5/00* (2006.01)

(52) U.S. Cl.
USPC ............. 345/156; 345/1.1; 345/173; 345/211

(58) Field of Classification Search
USPC .................................. 345/156–173, 1.1, 211
See application file for complete search history.

(56) References Cited

U.S. PATENT DOCUMENTS

| | | | |
|---|---|---|---|
| 6,455,128 B1 | 9/2002 | Moon | |
| 6,675,512 B1 | 1/2004 | Shwartz et al. | |
| 7,030,932 B2 | 4/2006 | Han | |
| 2002/0167483 A1* | 11/2002 | Metcalf | 345/156 |
| 2005/0088079 A1* | 4/2005 | Daniels | 313/504 |
| 2006/0007059 A1* | 1/2006 | Bell | 345/55 |
| 2007/0035561 A1* | 2/2007 | Bachelder et al. | 345/633 |
| 2007/0247422 A1* | 10/2007 | Vertegaal et al. | 345/156 |
| 2008/0204440 A1* | 8/2008 | Swain | 345/211 |
| 2008/0211825 A1 | 9/2008 | Sunakawa et al. | |
| 2009/0310290 A1* | 12/2009 | Tennent | 361/679.03 |

OTHER PUBLICATIONS

Australian Patent Office, International Search Report and Written Opinion mailed Nov. 26, 2010, in corresponding PCT application No. PCT/KR2010/005287.
Rubin, J., "NYX Wearable Displays," accessed at http://web.archive.org/web/20090428081041/http://www.coolhunting.com/archives/2004/11/nyx_wearable_di_1.php, Nov. 2, 2004, pp. 2.

* cited by examiner

*Primary Examiner* — Viet Pham
(74) *Attorney, Agent, or Firm* — Maschoff Brennan

(57) ABSTRACT

Cooperative multi-display systems and techniques are provided. In one embodiment, a cooperative multi-display system includes multiple flexible displays, a controller that processes an original image into sub-images, each of the sub-images being at a location in the original image that corresponds to a location of each of the multiple flexible displays, and a driver that drives the multiple flexible displays and forwards the processed sub-images from the controller to the multiple flexible displays, respectively.

20 Claims, 5 Drawing Sheets

(A)   (B)

COOPERATIVE MULTI-DISPLAY

BACKGROUND

The advent of the ubiquitous era has allowed access to information at any time in any place. Further, digital convergence technology, in which computers, communication and electronic instruments, etc., are fused and combined, is being rapidly developed. Thus, displays serving as interfaces between electronic instruments and humans are becoming more important. In place of bulky and heavy Cathode Ray Tubes (CRTs), displays have been developed in the form of flat and lightweight Flat Panel Displays (FPDs) However, the FPDs employ glass substrates to overcome extreme heat generated during fabricating processes. For this reason, there is a limit to which the FPDs can be made light, thin and flexible. Thus, by using flexible materials such as plastic in place of the inflexible glass substrates, flexible displays, which are capable of maintaining display performance even when bent or curved, like paper, have been developed and are emerging as next generation displays.

SUMMARY

According to an illustrative embodiment, a cooperative multi-display system includes multiple flexible displays, a controller that processes an original image into sub-images, each of the sub-images being at a location in the original image that corresponds to a location of each of the multiple flexible displays, and a driver that drives the multiple flexible displays and forwards the processed sub-images from the controller to the multiple flexible displays, respectively.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
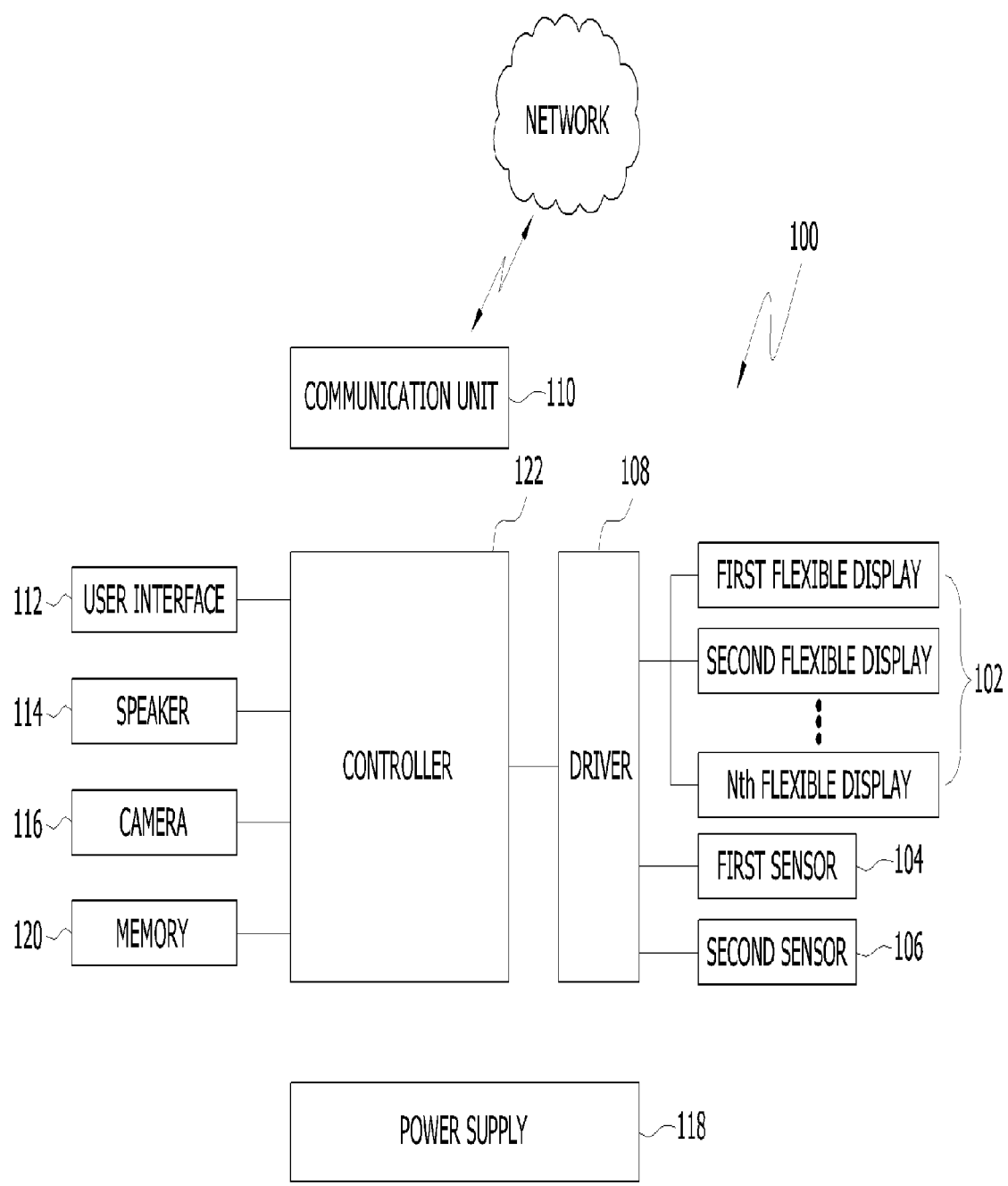
FIG. 1 shows an illustrative embodiment of a cooperative multi-display system.

In the following detailed description, reference is made to the accompanying drawings, which form a part hereof In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

FIG. 1 shows an illustrative embodiment of a cooperative multi-display system 100. As depicted, the cooperative multi-display system 100 includes flexible displays 102, a first sensor 104, a second sensor 106, a driver 108, a communication unit 110, a user interface 112, a speaker 114, a camera 116, a power supply 118, a memory 120, and a controller 122.

The flexible displays 102 display sub-images extracted and processed from an original image. Each of the flexible displays 102 can be attached or otherwise affixed to clothing, hats, or accessories (e.g., purses, shoes, bags, etc.) of a user, such as a human being, a pet or other animal, a robot or the like. The flexible displays 102 may be sorted and attached in a manner such that one flexible display 102 is attached to an article of clothing of or worn by a user, another flexible display 102 is attached to a hat of or worn by the user, and one or more other flexible displays 102 are attached to one or more accessories of or belonging to the user. The flexible displays 102 can have or be of various shapes such as a quadrilateral shape, a triangular shape, a circular shape, and so on. The flexible displays 102 allow a user to present his/her own uniqueness (e.g., individuality, fashion, expression, message, etc.). For example, by attaching two flexible displays 102 to a shirt and a bag (or a shirt and pants, a shirt and a hat, etc.), respectively, and then displaying two sub-images processed from an original image, one sub-image on one flexible display 102 and the other sub-image on the other flexible display 102, the user can present his/her own unique individuality. Also, the flexible displays 102 can be attached to articles worn by, carried by or otherwise associated with multiple users, and each flexible display 102 can be used to display respective sub-images processed from an original image. By way of example, in the case of two users, the flexible displays 102 attached to the two users (e.g., the flexible displays 102 respectively attached to articles of clothing worn by two users) can present a couple image between couples, partners including romantic partners, family members, or the like. Each of the flexible displays 102 can be fabricated in a form of a plastic-film liquid crystal display (LCD), an organic electroluminescent diode (OLED), a wearable display, an electronic paper, or the like.

The first sensor 104 detects deformation to the shape of the flexible displays 102. By way of example, when one flexible display 102 is attached to an item of clothing and another flexible display 102 is attached to a hat worn by a user, the flexible displays 102 can be deformed by the motion of the user. In order to detect possible deformation, the first sensor 104 can periodically monitor each flexible display 102 for a predetermined amount or degree of change, alteration or variance to the shape of the flexible display 102 from a base shape (i.e., the shape of the flexible display 102 in a normal or not deformed state). For example, the first sensor 104 can monitor and detect the coordinates of particular points (e.g. an edge, a corner, etc) on the flexible display 102. If the detected coordinates are beyond a predetermined coordinate range from the base coordinates of the particular points in a normal or not deformed state, the first sensor 104 can determine that deformation of the flexible display 102 has occurred. Deformation of flexible displays 102 is further discussed below with reference to FIG. 3. Upon detecting the deformation, the first sensor 104 sends deformation information that describes the detected deformation of a monitored flexible display 102 to the controller 122 for processing as further described below. The first sensor 104 may send the deformation information to the controller 122 either directly or through one or more other components such as the driver 108. The first sensor 104 can be attached or coupled to one or more flexible displays 102. Further, multiple first sensors 104 may be attached to one flexible display 102.

The second sensor 106 determines a state of the physical environment proximate to or around the cooperative multi-display system 100. The physical environment may refer to bodily conditions, such as temperature, pulse, blood pressure, etc., of a user, or weather conditions such as temperature, humidity, quantity of solar radiation, etc., around the cooperative multi-display system 100. In one embodiment, the second sensor 106 may be implemented as one or more sensors, each sensor capable of and configured to monitor one or more particular physical environment characteristics, and to determine a state value that represents the detected state of the monitored physical environment characteristic. For example, one sensor may monitor and determine a state value that represents one or more bodily conditions of a user, and another sensor may monitor and determine a state value that represents the weather condition (e.g., temperature, humidity, atmospheric pressure, etc.) near or proximate the cooperative multi-display system 100. The second sensor 106 can periodically monitor and determine a state value representing the state of the monitored physical environment proximate to the cooperative multi-display system 100 and send the state value to the controller 122 for processing as further described below. The second sensor 106 may send the state value to the controller 122 either directly or through one or more other components such as the driver 108.

The driver 108 drives some or all of the flexible displays 102 under control of the controller 122. The driver 108 receives the processed sub-images from the controller 122, and sends them to the respective flexible displays 102 for display. The driver 108 may be supplied with power from the power supply 118, and may supply power to the flexible displays 102, the first sensor 104, or the second sensor 106. The driver 108 may receive the deformation information that describes the detected deformation of the respective flexible displays 102 from the first sensor 104, and may relay or send it to the controller 122. Further, the driver 108 may receive the state value that represents the detected state of the physical environment proximate to or around the cooperative multi-display system 100 from the second sensor 106, and may relay or send the state value to the controller 122. The aforementioned operations of the driver 108 are provided as examples and for simplicity and one skilled in the art will appreciate that the driver 108 may be configured to perform other operations in addition to those described herein.

The communication unit 110 facilitates coupling of the cooperative multi-display system 100 with an external network. For example, when coupled to an external network, the communication unit 110 can send and/or receive images to be displayed on the flexible displays 102 to and/or from one or more remote devices via the external network. As used herein, the external network refers to at least one of wired or wireless communication networks. For example, the external network may include the Internet, intranet, extranet, broadband convergence network, local area network, integrated services digital network, virtual private network, or the like. The communication unit 110 can be used as a wired communication unit or a wireless communication unit depending on the type of the external network.

The user interface 112 provides an operator, such as a user, an environment for interfacing (e.g., entering or sending an operational instruction, receiving or viewing results of an operational instruction, etc.) with the cooperative multi-display system 100. For example, the user interface 112 may allow a user to select or change the image or images that are to be displayed on the flexible displays 102. The user interface 112 may allow the user to operate the camera 116 to, for example, capture surrounding scenery. The user interface 112 may include various types of interfaces such as a graphic user interface, a natural user interface, a human computer interface, or the like. For example, the user interface 112 may employ the human computer interface. In this case, the input from the user can be received in the form of voice through voice recognition technology, voice synthesis technology, or natural language processing technology. Further, the user interface 112 may be configured to perform a simple switch function such as a power on/off function.

In some embodiments, the user interface 112 may be implemented in a device that is detached or remote from the cooperative multi-display system 100. By way of example, the user interface 112 and necessary other components including one or more components of the cooperative multi-display system 100 may be implemented in or as part of a handheld device such as a remote control unit, a mobile communications unit, a mobile telephone, a personal digital assistant, a mobile entertainment device (e.g., MP3 player), or the like. In this implementation, the device including or housing the user interface 112 may communicate with one or more cooperative multi-display systems 100 in the vicinity of or proximate to the user interface 112 using any one of a variety of well-known wireless communication techniques known in the art.

The speaker 114 provides audible output under control of the controller 122. The audible output may include sounds that correspond to the sub-images being displayed on the flexible displays 102. For example, when an image of a swan sitting on a placid lake is being displayed on one or more of the flexible displays 102, the speaker 114 may output predetermined sounds associated with the displayed image of the swan, such as Tchaikovsky's Swan Lake. The speaker 114 can be realized as various types of speakers such as an internal speaker or an external speaker, and can be used in connection with other audible devices such as earphones.

The camera 116 can be operated to capture or record images such as images of the scenery or the surrounding environment proximate to the cooperative multi-display system 100. The camera 116 may operate under the control of the controller 122 or a user using user interface 112. The camera 116 may store the recorded images on suitable recording media such as the memory 120. The camera 116 may also send the recorded images to the controller 122 for processing including storing the recoded images in memory 120.

The power supply 118 provides or supplies electrical or other types of energy to the cooperative multi-display system 100. In some embodiments, the power supply 118 can convert kinetic energy generated from the movement of a user of the cooperative multi-display system 100 into electrical energy, accumulate the converted electrical energy, and use the accumulated electrical energy to power the cooperative multi-display system 100. For example, the power supply 118 may be installed in the shoes of a user, convert kinetic energy caused by the movement of the user into electrical energy whenever the user walks, and use the converted electrical energy. In other embodiments, the power supply 118 may be a battery power supply including a rechargeable battery power supply. In some embodiments, the power supply 118 may supply energy generated from multiple sources such as, by way of example and not limitation, the aforementioned electrical energy converted from kinetic energy and rechargeable battery.

Depending on the desired configuration, the memory 120 is computer-readable media that may store or contain information, data including the various images, or data/information/instructions that are used or generated by the cooperative multi-display system 100. The images may be input from, for example, desktop/laptop computers or removable storage media such as USBs, memory sticks, or portable hard disks, or may be received from one or more remote devices via an external network. Multiple images may be related, for example, according to one or more characteristics or traits such as a subject, (e.g., singer, artist, and so on), scenery being portrayed, message being communicated, or the like, or any combination thereof For example, the related images may be images depicting pictures painted, drawn or otherwise produced by the same artist (e.g., Picasso, van Gogh, etc.). The images may be either two-dimensional images, such as photographs or pictures, or three-dimensional images, such as moving pictures (e.g., video). The memory 120 may store an image table that includes one or more records that contain information regarding the images including original images, each of which may be mapped to a state value that represents a state of the physical environment proximate to or around the cooperative multi-display system 100, information that indicates a level of power being supplied by the power supply 118, partner information describing a partner matched with or desired by a user, or information regarding other appropriate image mapping characteristic. For example, in the image table, an image of a volcano bursting into an eruption may be mapped to a predetermined temperature, pulse, or blood pressure value that is higher than the temperature, pulse, or blood pressure of a user of the cooperative multi-display system 100 in a typically normal state. Then, when one or more of the user's temperature, pulse, or blood pressure is determined to exceed the respective predetermined value, the cooperative multi-display system 100 may display the mapped image of the bursting volcano on one or more of its flexible displays 102. Only one example image table entry is described for simplicity and one skilled in the art will appreciate that that the image table may contain other different or additional image mappings.

The controller 122 controls the operation or functionality of the aforementioned components of the cooperative multi-display system 100 to, for example, display an image on the respective flexible displays 102. In one illustrative embodiment, the controller 122 receives a request to display an image, for example, from a user via the user interface 112. In response, the controller 122 selects an original image for display from the memory 120. The user may have specified the original image to select or the controller 122 may automatically make the selection, for example, based on a preprogrammed instruction, a detected physical environmental characteristic, etc. The controller 122 then processes the selected image into sub-images. By way of example, the controller 122 can process the original image selected from the memory 120 into the sub-images so that each of the sub-images corresponds to a location or shape of the respective flexible displays 102. The controller 122 can then display one or more of the sub-images on the corresponding respective flexible displays 102.

Figure 2:
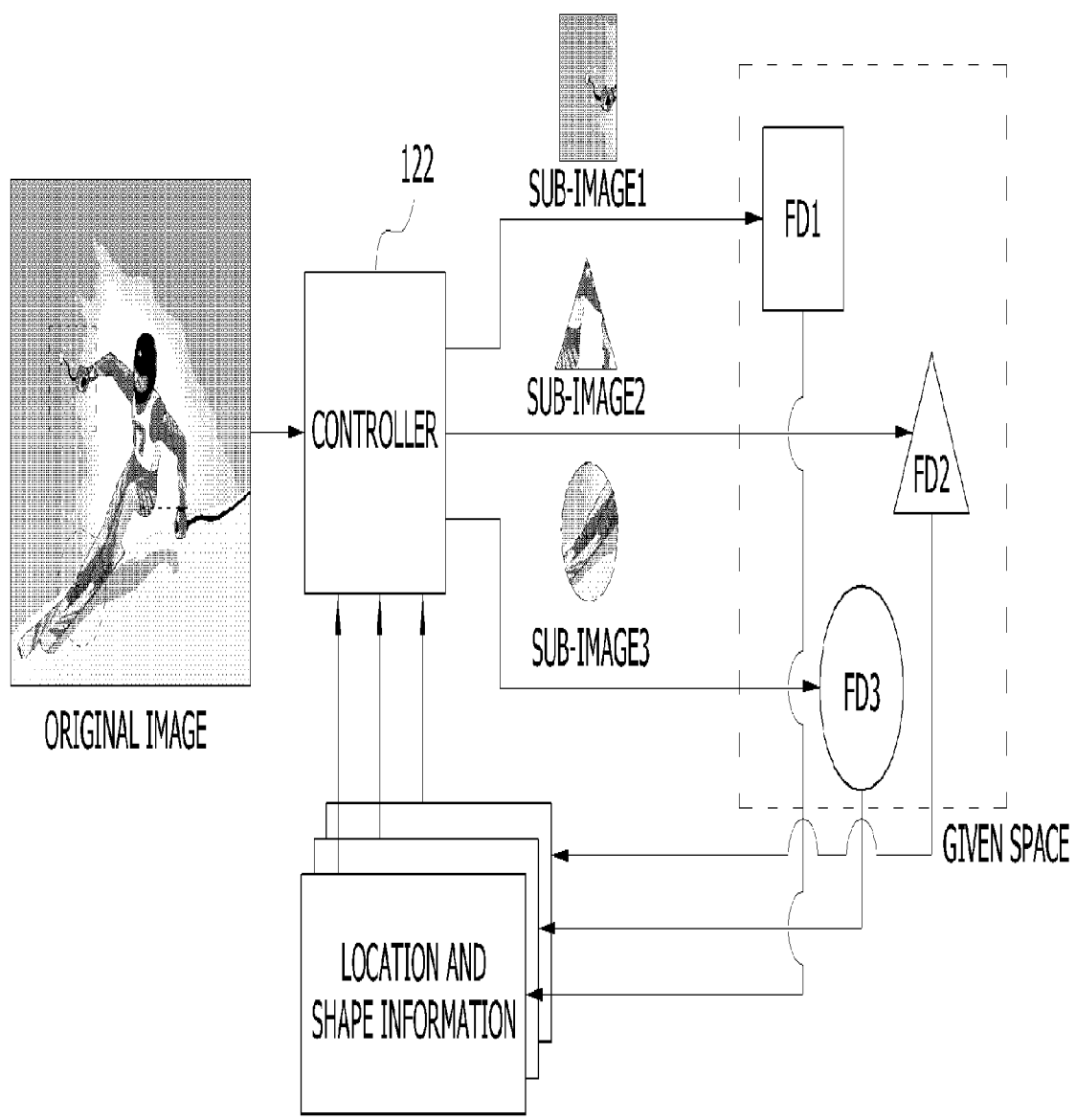
FIG. 2 shows a diagram of an illustrative embodiment of a process for displaying images in the cooperative multi-display system.

FIG. 2 shows a diagram of an illustrative embodiment of a process for displaying images in the cooperative multi-display system 100. As shown in FIG. 2, it is assumed that three flexible displays FD1, FD2 and FD3 of a quadrilateral, triangular, and circular shape, respectively, are located within a given space (as indicated by the dashed line). The given space may include the area proximate to a user of the cooperative multi-display system 100 and, more particularly, is an area that sufficiently encloses or contains the flexible displays FD1, FD2 and FD3. By way of example, the flexible displays FD1 and FD3 may respectively be attached or affixed to the upper left and lower right sections of the front of a shirt worn by the user, and the flexible display FD2 may be affixed to a cap worn by the user. In this example, each of the flexible displays FD1, FD2 and FD3 are located in a respective region or area of the given space, e.g., the upper part of the user's body. Information regarding the respective locations and shapes of the three flexible displays FD1, FD2 and FD3 in the given space can be preprogrammed into the controller 122, for example, at the time of manufacture. The controller 122 can select an original image stored in the memory 120. The controller 122 can then process the selected original image into three sub-images based on the preprogrammed information to display the sub-images on the appropriate flexible displays FD1, FD2 and FD3. That is, as shown in FIG. 2, a first sub-image that is to be displayed on the first flexible display FD1 may have a quadrilateral shape corresponding to the shape of the first flexible display FD1, and may depict a region or section of the original image that corresponds to the location of the flexible display FD1 in the given space. A second sub-image that is to be displayed on the first flexible display FD2 may have a triangular shape corresponding to the shape of the first flexible display FD2, and may depict a region or section of the original image that corresponds to the location of the flexible display FD2 in the given space. A third sub-image that is to be displayed on the first flexible display FD3 may have a circular shape corresponding to the shape of the first flexible display FD3, and may depict a region or section of the original image that corresponds to the location of the flexible display FD3 in the given space. The three processed sub-images can be sent to and displayed on the three flexible displays FD1, FD2 and FD3, respectively.

Furthermore, the controller 122 can monitor and/or compensate for an occurrence of one or more exception conditions. Exception conditions include, without limitation, deformation of one or more flexible displays 102, change in the state value representing the physical environment, input of the captured surrounding scenery image, change in the level of power supplied from power supply 118, receipt of remote user information from a remote cooperative multi-display system, etc. The processing of the respective exception conditions are further described below.

In one embodiment, the controller 122 may receive deformation information that describes deformation of one or more flexible displays 102. For example, as described above, the first sensor 104 may send deformation information to the controller 122 upon detecting the deformation of a monitored flexible display 102. In response to receiving the deformation information, the controller 122 compensates for the deformation when displaying the sub-images on the deformed flexible display 102 based on the received deformation information. Accordingly, even though one or more flexible displays 102 are deformed, for example, by movement of a user, distortion-free sub-images can be displayed on the one or more flexible displays 102.

Figure 3:
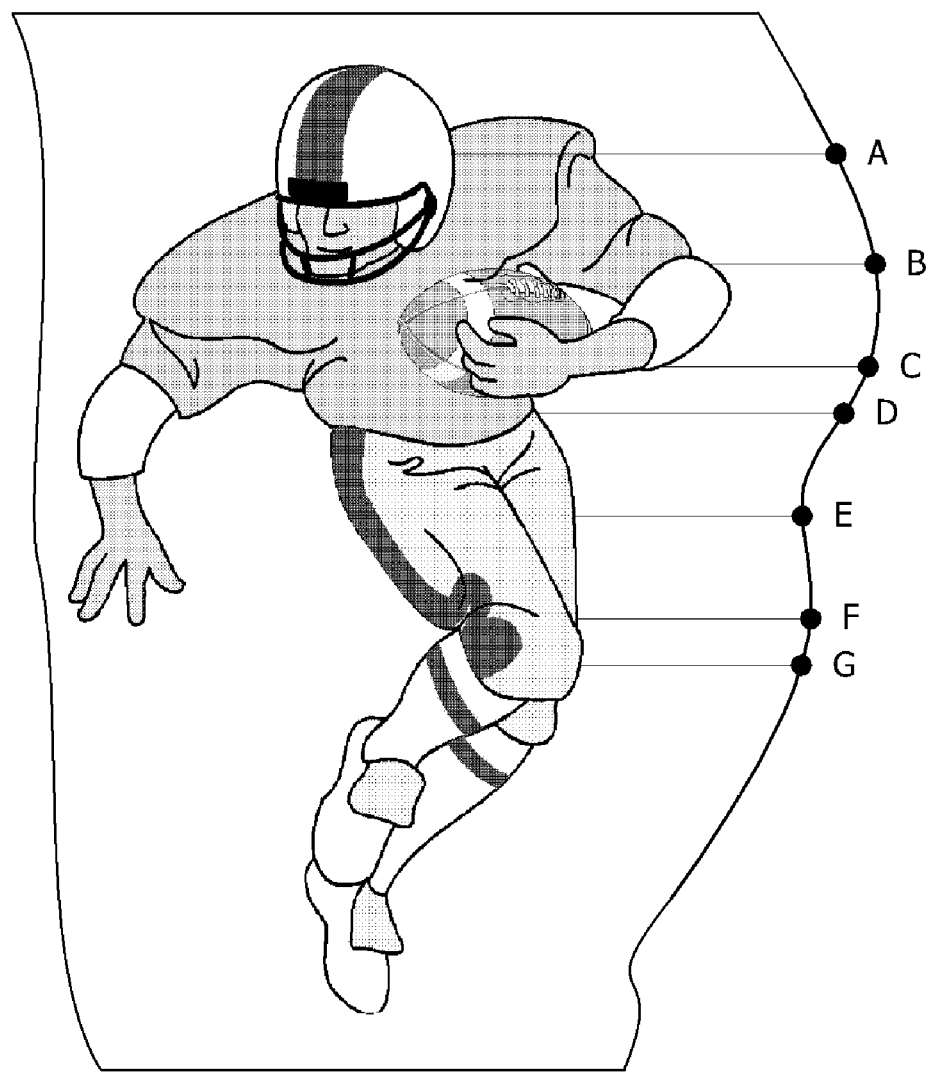
FIG. 3 shows an illustrative distorted image displayed on a flexible display.

FIG. 3 shows an illustrative distorted image displayed on a flexible display. By way of example, as depicted, it is assumed that seven sensors A through G are vertically attached to a single flexible display 102 at equal intervals. When the flexible display 102 becomes deformed as illustrated in FIG. 3, distances between the sensors A and B and between the sensors B and C may be wider than distances between the sensors C and D and between the sensors F and G. In this instance, in order to make possible the normal viewing of the image displayed on the flexible display 102 from the front, the distances between the sensors C and D and between the sensors F and G may be increased, or the distances between the sensors A and B and between the sensors B and C may be decreased. The calculation of the distances may be performed using an affine transformation expressed by Equation 1 below.

$$\begin{bmatrix} x' \\ y' \end{bmatrix} = \begin{bmatrix} a & b \\ c & d \end{bmatrix}\begin{bmatrix} x \\ y \end{bmatrix} + \begin{bmatrix} e \\ f \end{bmatrix} \qquad \text{Equation 1}$$

where (x, y) indicates the coordinates of the original image, (x', y') indicates the coordinates of the distorted image, a, b, c and d are the coefficients indicating a rotation angle, and e and f are the coefficients indicating a translation.

The coordinate value (x, y) of the original image and the coordinate value (x', y') of the distorted image are applied to Equation 1, and an inverse matrix is used. Thereby, the coefficients a through f for restoring the distorted image can be obtained. The controller 122 can compensate for the distortion of the image using the calculated coefficients, and display the compensated image on the flexible display 102. The effect is that a distorted image appears normal when displayed.

Referring again to the exception conditions, in one embodiment, the controller 122 may receive a state value that represents the state of the physical environment (e.g., bodily conditions such as temperature, pulse, blood pressure, etc., of a user, or weather conditions around the cooperative multi-display system 100). By way of example, the second sensor 104 may periodically send a state value representing the state of the physical environment to the controller 122. The controller 122 can compare the received state value to a preset normal state value to determine whether or not a change has occurred to the physical environment. A change may be detected when the received state value differs or varies from the normal state value by a predetermined amount. If the controller 122 determines that the state value representing the state of the physical environment has changed (i.e., a change has occurred to the physical environment), the controller 122 can select an image that is mapped to determined state represented by the received state value from the memory 120. For example, when the controller 122 determines that the state value representing the pulse or blood pressure of the user is higher than a predetermined normal state value, the controller 122 may assign or identify the emotional state of the user to be in an "angry" state and select an image mapped or associated with the "angry" state from the memory 120. By way of example, an image of an erupting volcano may be associated with the "angry" state. The controller 122 may then process the selected image into sub-images, and display one or more of the processed sub-images on respective flexible displays 102 thereby replacing any sub-images currently being displayed.

Referring again to the exception conditions, in one embodiment, the controller 122 may control the camera 116 to capture surrounding scenery images in response to, for example, instruction input by a user through the user interface 112, and then display the captured surrounding scenery image on the one or more flexible displays 102. In this case, the flexible displays 102 displaying the surrounding scenery image can function as a transparent cloak. For example, assuming that the flexible displays 102 are attached to the clothing of a user, the camera 116 can capture rear scenery images behind the user, and send it to the controller 122. The controller 122 can then process the captured rear scenery images into sub-images, and display the processed sub-images on respective flexible displays 102. As a result, the captured rear scenery image can be displayed on the clothing of the user to portray an effect that the user is wearing a transparent cloak.

Referring again to the exception conditions, in one embodiment, the controller 122 may periodically detect or determine the level of power being supplied by the power supply 118 and select an image that corresponds to the detected power level for display on the flexible displays 102. By way of example, the controller 122 can compare the detected power level against a preset reference power level, and select an image based on the result of the comparison. For example, when a detected power level of the power supply 118 is higher than or exceeds the preset reference power level, the controller 122 may select an image that corresponds to the detected power level exceeding the preset reference power level. The corresponding image may, for example, be that of an image of a lion snarling or a thunderbolt flashing. In contrast, when the detected power level of the power supply 118 does not exceed the preset reference power level, the controller 122 may select an image that corresponds to the detected power level not exceeding the preset reference power level. The corresponding image may, for example, be that of an image of a lion sleeping or stars softly twinkling. The controller 122 may process the selected image into sub-images, and display one or more of the processed sub-images on respective flexible displays 102.

Referring again to the exception conditions, in one embodiment, the controller 122 may receive remote user information from a remote cooperative multi-display system. The remote user information describes a user of a remote cooperative multi-display system. As described above, multiple cooperative multi-display systems may communicate with each other and, by way of example, send or receive their respective user's partner information to one or more other cooperative multi-display systems via communication unit 110. In response to receiving the remote user information, the controller 122 can check to determine whether there is a match between the received remote user information and previously specified partner information. Here, partner information generally refers to information associated with or that describes a partner preferred or desired by a user of the cooperative multi-display system 100. For example, the user may input or specify to the cooperative multi-display system 100 information such as height, weight, face shape, etc. describing a partner whom the user seeks or desires. The user may also input or provide to the cooperative multi-display system 100 information that describes the user (e.g., this may be the remote user information that the cooperative multi-display system 102 sends to one or more other cooperative multi-display systems). The cooperative multi-display system 100 can then associate or map the partner information to the user or, more particularly, to the user's information (i.e., information describing the user). In response to determining that match exists between the received remote user information and the partner information, the controller 122 may select an original image that is mapped to the partner information (e.g., the mapped image may signify or indicate a match between the two users) from the memory 120. By way of example, the mapped image may be an image of hearts shining. The controller 122 may process the selected image into sub-images, and display one or more of the processed sub-images on respective flexible displays 102. In some embodiments, the controller 122 may send the selected image to the remote cooperative multi-display system that originally sent the remote user information for display on the remote cooperative multi-display system. Thus, multiple cooperative multi-display systems can share and display the selected original image with one another. For example, an image of hearts shining may be displayed on flexible displays of multiple cooperative multi-display systems.

Figure 4:
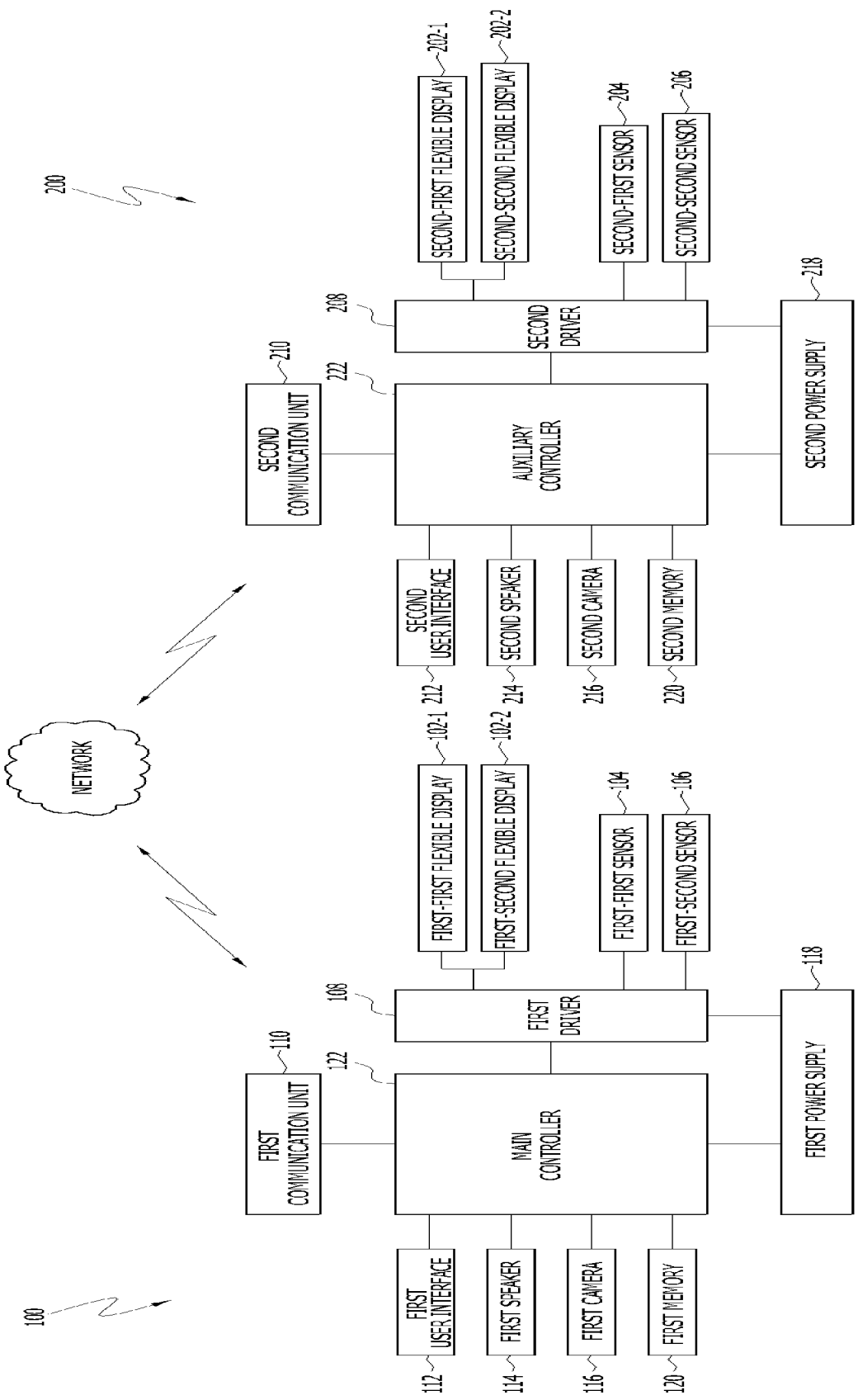
FIG. 4 shows an illustrative embodiment of a cooperative fashion system.

A cooperative fashion system may include two or more cooperative multi-display systems 100. FIG. 4 shows an illustrative embodiment of a cooperative fashion system that includes a first cooperative multi-display system, such as the cooperative multi-display system 100 (the cooperative multi-display system 100 will also be referred to below as the first cooperative multi-display system 100), and a second cooperative multi-display system 200. Only two cooperative multi-display systems are shown in FIG. 4 for simplicity and one skilled in the art will appreciate that there may be a different number of cooperative multi-display systems. As depicted, the first and second cooperative multi-display systems 100 and 200 are each shown as including two flexible displays. Moreover, many components of the second cooperative multi-display system 200 are substantially similar to the corresponding components of the cooperative multi-display system 100 as described above in conjunction with FIG. 1, and the description thereof will not be repeated for clarity.

As described above, the main controller 122 of the first cooperative multi-display system 100 may control the other components of the first cooperative multi-display system 100. Similarly, an auxiliary controller 222 of the second cooperative multi-display system 200 may control the other components of the second cooperative multi-display system 200. In the cooperative fashion system, the main controller 122 can be configured to control the auxiliary controller 222. In other words, the main controller 122 can be configured to control the overall operation of the first and second cooperative multi-display systems 100 and 200. For example, if any of first-first and first-second flexible displays 102-1 and 102-2 or second-first and second-second flexible displays 202-1 and 202-2 are deformed, the main controller 122 can determine the degree of deformation of each of the flexible displays 102-1, 102-2, 202-1 and 202-2, use this information to compensate for image distortion, and then display one or more compensated images on the respective flexible displays 102-1, 102-2, 202-1 and 202-2. In this case, when the main controller 122 controls the overall operation of the first and second cooperative multi-display systems 100 and 200, the auxiliary controller 222 may send appropriate data or information received from the components of the second cooperative multi-display system 200 to the main controller 122.

The first and second cooperative multi-display systems 100 and 200 may perform data communication via an external network using the first and second communication units 110 and 210, respectively. For example, the main controller 122 can send the sub-images to be displayed on the second-first and second-second flexible displays 202-1 and 202-2 to the second communication unit 210 using the first communication unit 110. Further, the main controller 122 can receive the deformation information of the second-first and second-second flexible displays 202-1 and 202-2 detected by a second-second sensor 204 via the first communication unit 110. Here, the first and second cooperative multi-display systems 100 and 200 can communicate with each other by wired or wireless communication methods. In the case of the wireless communication, short range wireless communication such as WLAN, Bluetooth, UWB, Home RF, Zigbee, etc., can be used. Further, the first and second cooperative multi-display systems 100 and 200 can be interconnected through a mobile ad hoc network (MANET). In this case, the first and second cooperative multi-display systems 100 and 200 can be dynamically interconnected without an existing fixed network infrastructure.

Figure 5:
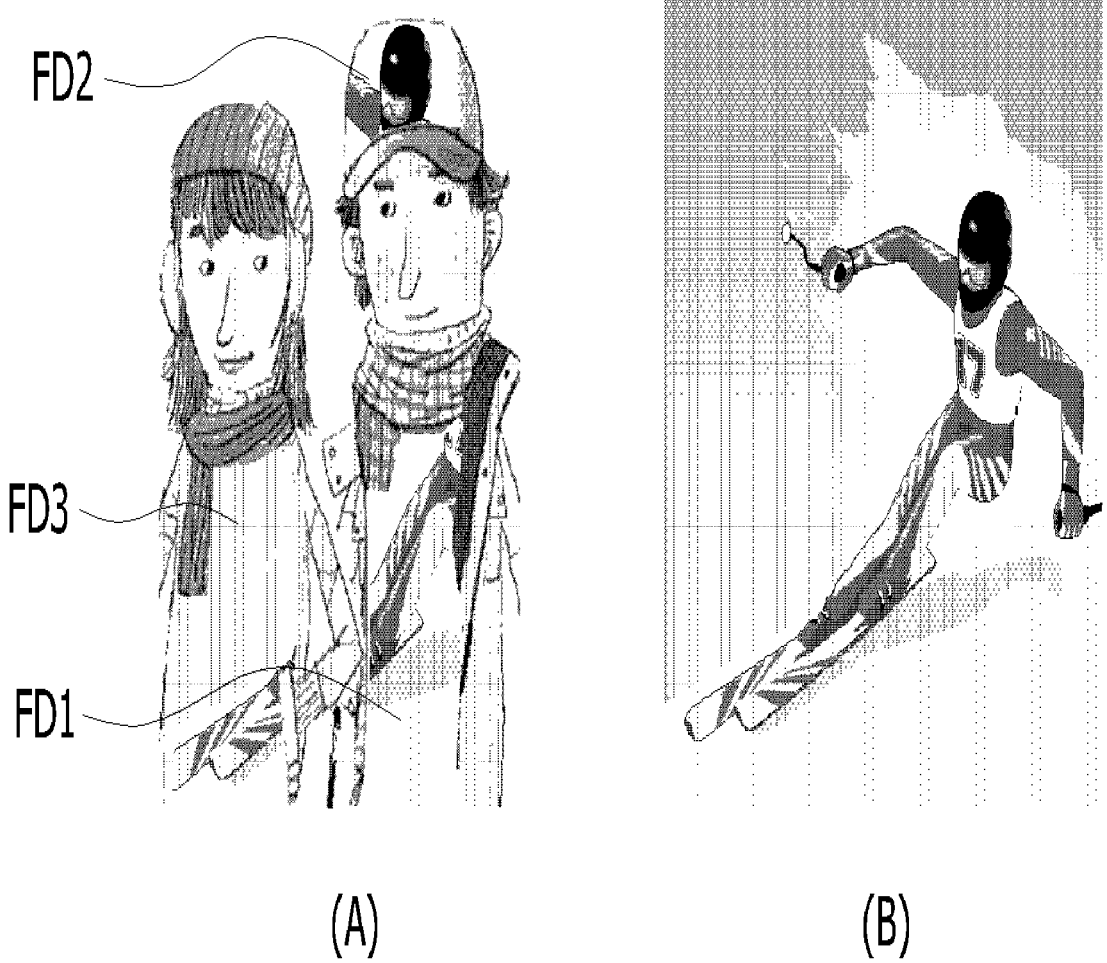
FIG. 5 shows an illustrative embodiment of the cooperative fashion system integrated on articles of clothing.

FIG. 5 shows an illustrative embodiment of the cooperative fashion system integrated on articles of clothing. As shown in (A) of FIG. 5, a first flexible display FD1 is attached to an upper garment worn by a man, a second flexible display FD2 is attached to a hat worn by the man, and a third flexible display FD3 is attached to an upper garment worn by a woman. Three sub-images may be extracted from an original image shown in (B) of FIG. 5, and displayed on the first, second and third flexible displays FD1, FD2 and FD3, respectively. By way of example, the controller 122 can processes the original image into three sub-images corresponding to the respective locations and shapes of the first, second and third flexible displays FD1, FD2 and FD3, and display the three corresponding sub-images on the first, second and third flexible displays FD1, FD2 and FD3, respectively. The first, second and third flexible displays FD1, FD2 and FD3 may be controlled by a single controller. Alternatively, three controllers may be allocated to and control the first, second and third flexible displays FD1, FD2 and FD3, respectively. In this case, one of the three controllers may be used as a main controller, and the others can be used as auxiliary controllers.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A cooperative multi-display system comprising:
   a plurality of flexible displays;
   a memory that stores an image table including original images, each of a subset of the original images being mapped to a state value that represents at least a state of the physical environment around the system;
   a controller associated with the memory that selects an original image from the memory mapped to a determined state value from the image table and that processes the original image into sub-images;
   a driver that drives the plurality of flexible displays and forwards the processed sub-images from the controller to the plurality of flexible displays, respectively; and
   a first sensor that detects deformations in one or more of the plurality of flexible displays and sends deformation information that describes the deformations to the controller, wherein the controller compensates the sub-images for the deformations detected in the one or more of the plurality of flexible displays using the deformation information.

2. The system of claim 1, wherein the sub-images have shapes corresponding to shapes of the plurality of flexible displays, respectively.

3. The system of claim 2, wherein a change in the shape of each of the one or more of the plurality of flexible displays causes the deformations.

4. The system of claim 1, wherein each of a second subset of the original images is mapped to a state value that represents at least a power level associated with the system.

5. The system of claim 1, wherein the physical environment comprises at least one of temperature, pulse, blood pressure, or weather.

6. The system of claim 1, further comprising a second sensor that determines the state value that represents the state of the physical environment around the system and sends the state value to the controller.

7. The system of claim 4, further comprising a power supply that supplies power to the controller and the driver and includes a power level associated with the system, wherein the power is generated by movement of the system or by a rechargeable battery.

8. The system of claim 7, wherein the controller detects the power level and selects the original image mapped to the detected power level from the image table.

9. The system of claim 1, further comprising:
   a communication unit that communicates particular information between the cooperative multi-display system and a remote cooperative multi-display system, the communication unit being associated with the controller, a second subset of the original images being mapped to the particular information,
   wherein, when the controller receives predetermined information from the remote cooperative multi-display system that matches the particular information, the controller
      selects the original image corresponding to the particular information from the image table of the memory to process the original image into the sub-images and
      sends the selected original image to the remote cooperative multi-display system.

10. The system of claim 1, further comprising a speaker that provides audible output associated with each of the sub-images.

11. The system of claim 1, further comprising a camera that captures surrounding scenery image and sends the captured surrounding scenery image to the controller, wherein the original image is the captured surrounding scenery image and the controller processes the captured surrounding scenery image into the sub-images.

12. A method for displaying images in a cooperative multi-display system, the method comprising:
   receiving a request to display an original image on a plurality of flexible displays;
   processing the original image into sub-images, each sub image corresponding to one of the plurality of flexible displays;
   detecting deformations in one or more of the plurality of flexible displays;
   generating deformation information that describes the deformations in the one or more of the plurality of flexible displays detected to have deformations;
   compensating the sub-images corresponding to the one or more of the plurality of flexible displays detected to have deformations based on the deformation information;
   sending to each of the one or more of the flexible displays detected to have deformations one of the compensated sub-images corresponding to the flexible displays detected to have deformations;
   sending to each of the flexible displays that do not have deformations one of the sub-images corresponding to the flexible displays that do not have deformations;
   receiving a state value that represents a state of the physical environment around the system;
   processing a replacement image mapped to the received state value into replacement sub-images; and
   sending each of the processed replacement sub-images to one of the plurality of flexible displays.

13. The method of claim 12, wherein processing the original image comprises processing each of the sub-images into a shape corresponding to a first shape of one of the plurality of flexible displays that corresponds to the respective sub-image, wherein the original image is processed into the sub-images based on a location of each of the plurality of flexible displays in a given space, each of the sub-images being at a location in the original image that corresponds to the location of each of the plurality of flexible displays.

14. The method of claim 13,
wherein the deformations in each of the one or more of the plurality of flexible displays is caused by a change in the first shape of each of the one or more of the plurality of flexible displays detected to have deformations.

15. The method of claim 12, further comprising, posterior to sending the compensated sub-images:
detecting the level of power being supplied to the system;
processing a replacement image mapped to the detected power level into replacement sub-images; and
sending each of the processed replacement sub-images to one of the plurality of flexible displays.

16. The method of claim 12, wherein the original image is a surrounding scenery image captured by a camera.

17. The method of claim 12, further comprising, posterior to sending the compensated sub-images:
receiving predetermined information matched with particular information stored in the system from a remote cooperative multi-display system;
processing a replacement image mapped to the particular information into replacement sub-images;
sending each of the processed replacement sub-images to one of the plurality of flexible displays; and
sending the replacement image to the remote cooperative multi-display system.

18. A method for displaying images in a cooperative multi-display system, the method comprising:
selecting an original image stored in a memory for display on a plurality of flexible displays;
processing the original image to generate a plurality of sub-images for display on the plurality of flexible displays, wherein each of the plurality of flexible displays one of the plurality of sub-images;
detecting deformations in one or more of the plurality of flexible displays;
compensating one or more of the plurality of sub-images that are displayed by the one or more of the plurality of flexible displays detected to have deformations for the deformations detected in the one or more of the plurality of flexible displays;
displaying the compensated one or more of the plurality of sub-images distortion-free on the one or more of the plurality of flexible displays with detected deformations;
receiving a state value that represents a state of the physical environment around the system;
processing a replacement image mapped to the received state value into replacement sub-images; and
sending each of the processed replacement sub-images to one of the plurality of flexible displays.

19. The system of claim 4, wherein at least one of the original images in the subset of the original images is in the second subset of the original images.

20. The system of claim 9, wherein at least one of the original images in the subset of the original images is in the second subset of the original images.

* * * * *

UNITED STATES PATENT AND TRADEMARK OFFICE
CERTIFICATE OF CORRECTION

| | | |
|---|---|---|
| PATENT NO. | : 8,508,471 B2 | Page 1 of 1 |
| APPLICATION NO. | : 12/540843 | |
| DATED | : August 13, 2013 | |
| INVENTOR(S) | : Suh | |

It is certified that error appears in the above-identified patent and that said Letters Patent is hereby corrected as shown below:

In the Specification

In Column 1, Line 58, delete "hereof In" and insert -- hereof. In --, therefor.

In Column 2, Line 42, delete "electroluminescent" and insert -- light emitting --, therefor.

In Column 5, Line 13, delete "thereof For" and insert -- thereof. For --, therefor.

In Column 7, Line 6, delete "below." and insert -- below: --, therefor.

In Column 7, Lines 31-32, delete "second sensor 104" and insert -- second sensor 106 --, therefor.

In Column 8, Lines 50-51, delete "multi-display system 102" and insert -- multi-display system 100 --, therefor.

In Column 9, Lines 58-59, delete "second-second sensor 204" and insert -- second-first sensor 204 --, therefor.

In Column 11, Line 8, delete "thereof In" and insert -- thereof. In --, therefor.

In Column 13, Line 9, delete "thereof" and insert -- thereof. --, therefor.

In the Claims

In Column 16, Line 7, in Claim 18, delete "flexible displays" and insert -- flexible displays displays --, therefor.

Signed and Sealed this
Twenty-sixth Day of August, 2014

Michelle K. Lee
*Deputy Director of the United States Patent and Trademark Office*